United States Patent [19]

Braithwaite et al.

[11] 3,975,283

[45] Aug. 17, 1976

[54] HIGH BULK DENSITY MAGNESIUM CHLORIDE AND METHOD FOR MAKING SAME

[75] Inventors: David G. Braithwaite, Brookhaven, Miss.; William P. Hettinger, Jr., Iselin, N.J.

[73] Assignee: NL Industries, Inc., New York, N.Y.

[22] Filed: Mar. 21, 1975

[21] Appl. No.: 560,337

[52] U.S. Cl............................ 252/182; 252/315; 252/317; 23/293 A; 23/300; 23/304; 423/160; 423/161; 423/498; 423/155
[51] Int. Cl.².................................... C09K 3/00
[58] Field of Search................. 252/182, 315, 317; 423/161, 160, 498; 23/293 A, 300, 304

[56] References Cited
UNITED STATES PATENTS

| | | |
|---|---|---|
| 3,096,152 | 7/1963 | Hadzeriga ........................ 423/160 |
| 3,516,785 | 6/1970 | Smith ............................... 423/163 |

OTHER PUBLICATIONS

Condensed Chemical Dictionary (8th Ed.) Van Nostrand Reinhold Co., New York (1971), p. 534.

*Primary Examiner*—Benjamin R. Padgett
*Assistant Examiner*—E. Suzanne Parr

[57] ABSTRACT

A gelling agent is added to a brine containing magnesium chloride to convert the brine into a gel which is spray dried to produce dried magnesium chloride comprising substantially solid discrete particles of magnesium chloride having bulk densities in the range from about 12 to 45 pounds per cubic foot.

10 Claims, No Drawings

HIGH BULK DENSITY MAGNESIUM CHLORIDE AND METHOD FOR MAKING SAME

BACKGROUND OF INVENTION

Magnesium chloride is presently used extensively in the production of metallic magnesium by electrolysis of the fused chloride. Widely used sources of magnesium chloride are sea water, salt lakes and similar brines from which a magnesium chloride concentrate is recovered. When this concentrate is heated to drive off the physically combined water, a magnesium chloride hydrate is formed which contains a substantial amount of chemical combined water. It is essential, however, to the recovery of magnesium metal by electrolysis of fused magnesium chloride, that the magnesium chloride feed to the cell be substantially free of water of crystallization, for otherwise $H_2$ will be formed at the cathode; and $O_2$ and compounds of oxygen will be envolved at the anode thus causing rapid errosion of the anodes. Also, any MgO and MgOHCl in the feed must be removed otherwise particulate MgO will form and sink to the bottom of the cell to form a sludge which reduces the operating efficiency of the cell, requires much labor and equipment to remove from the cell, forms irreversible deposits which eventually prevent salt circulation and require cell shut-down and rebuilding as well as reducing the recovery of metallic magnesium which becomes trapped in the cell "smut" deposits.

One present practice for forming a substantially dry magnesium chloride suitable as a feed material for electrolytic cells is to use a spray-dry unit including cyclone separator. Units of this type are traversed by heated gases having preferably an air inlet temperature of about 1000°F and an air outlet or discharge temperature of about 500°F. The magnesium chloride concentrate is fed into the inlet of the spray drier and is recovered from the outlet in the form of substantially dry magnesium chloride of no more than about 3–5% water—which, after being further dehydrated in a melt cell, has been found to be sufficiently free of water to be used effectively in electrolytic cells to produce magnesium metal. However, this spray-dried product is a dry, very light, fluffy material, about 800 microns in size and of balloon-like characteristics, very fragile and easily broken up into very thin walled particles of low bulk density. As the consequence it is difficult to handle mechanically, store, or to control when feeding into melt cells for forming molten magnesium chloride.

SUMMARY OF INVENTION

The present invention relates to a dried magnesium chloride of relatively high bulk density; and to a method for making the same wherein a magnesium chloride brine, preferably a desulfated, decarnallited brine, hereinafter referred to as a pretreated magnesium chloride brine, produced, for example, from Great Salt Lake brine in accordance with the disclosure in U.S. Pat. No. 3,516,785 and comprising essentially from about 30–45% magnesium chloride from about 60–65% $H_2O$, plus trace amounts of other metals and/or metal salts, is homogenized with a gelling agent to form a magnesium chloride gel which is then spray dried to form dry, substantially solid, discrete particles of $MgCl_2$ brine of relatively high bulk density. As used herein the term "dry" or "dried" will be understood to identify finely divided magnesium chloride containing no more than 3% and preferably less than 1% chemically combined water; while the phrase "of high bulk density" is definitive of dried magnesium chloride having a bulk density of at least 20 pounds per cubic foot.

More particularly, the gelling agent or gellant used in preparing the brine gel of this invention is a hydrous metal oxide, or hydrous metal carbonate. The gellant is/are selected so as to preclude introduction of contaminants into the magnesium chloride brine suitable gellants being magnesium hydroxide, sodium hydroxide, or hydrous magnesium carbonate. The gelling agent may be preformed and added to the magnesium chloride brine or it may be formed in situ. In either case the gellant and magnesium chloride brine are homogenized at elevated temperature, followed by cooling with continuous agitation until a brine gel is formed. This gel is then dried preferably by spray drying, followed by collecting the dried magnesium chloride as discrete, substantially solid particles of relatively high bulk density.

Without being bound to any particular theory as to the reactions resulting from the addition of the gellant to the magnesium chloride brine, it is postulated that during drying the gelled magnesium chloride containing brine dries and shrinks to form relatively dense particulate particles of magnesium chloride. In any event, whereas magnesium chloride recovered from the cyclone separator associated with conventional spray-drying apparatus may have a bulk density as low as about 6 pounds per cubic foot, the dried magnesium chloride formed according to the method of the instant invention has been found to have bulk densities in range of at least 12 to as high as 45 pounds per cubic foot. In this connection the amount of gellant used to form dried magnesium chloride having bulk density in the aforesaid range has been found to be from 0.1 to 10% and preferably from 1.0 to 5.0% on a salt weight basis.

As a relatively dense material the substantially dry magnesium chloride produced by the method of this invention is readily collected, easy to handle and affords increased storage capacity, does not clog bag filters and can be readily fed into a melt cell for producing molten magnesium chloride electrolyte. In addition to these advantages the solid, particulate particles of dried magnesium chloride have been found to be ideally suited to chlorination operations for removing contaminants such as magnesium oxide or boron from the solid salt in a fluid bed of equivalent type chlorination treatment.

PREFERRED EMBODIMENT OF THE INVENTION

As pointed out above, the present invention comprehends the use of anyone of several gelling agents including, for example, magnesium hydroxide, sodium hydroxide, and magnesium carbonate; and while $Mg(OH)_2$ prepared externally by hydration of calcined MgO is effective it is preferred to form the $Mg(OH)_2$ in situ, as for example by adding calcined MgO, to an aliquot of brine.

Thus the preferred procedure for gelling a magnesium chloride brine for use as spray drier feed is to form a gellant by homogenizing an aliquot of the brine with an aqueous slurry of magnesium oxide both at elevated temperature, and adding the resulting slurry to the remaining brine at elevated temperature and with agitation followed by cooling whereupon the entire brine is gelled, the time required to form the brine gel being dependent on the ratio of gellant to the aliquot of brine, temperatures, and similar factors. In this connection it has been found that temperature is a significant factor in the formation of a gel; that the temperature of the gellant slurry should be preferably below 100°F and that the temperature of the brine to which the gellant is added should not be above about 200°F.

As an alternative to the preferred procedure a gellant may be made by homogenizing a mixture of magnesium oxide and warm tap water i.e. about 72°F and then adding the resulting slurry to the magnesium chloride brine at 200°F followed by continuous agitation and cooling. Upon cooling with continued agitation the brine will gel. Using this procedure brine gels have been formed in 45 minutes. If cold tap water is used and the aliquot of brine is at room temperature the gel will be formed even more rapidly i.e. in about 60 minutes.

A metal oxide found to be most effective in forming a magnesium hydroxide gellant according to the method of this invention is MgO in the form of calcined magnesite. However, other forms of magnesium oxide varying in physical characteristics from calcined magnesite are contemplated within the scope of the present invention. Moreover, other gelling agent found to be effective include ammonium hydroxide and sodium hydroxide.

The invention also comprehends a further modification wherein the gellant is prepared by homogenizing the magnesium oxide with an aliquot of brine at elevated temperature and the resulting slurry dispersed in the remaining brine also at elevated temperature with continued agitation. Using this procedure gels have been formed in 30 minutes.

In addition to gels formed with a metal oxide i.e. magnesium oxide, brine gels have been formed using a hydrous $MgCO_3$ gellant wherein an aqueous slurry of $NaCO_3$ at about 72°F is added to an aliquot of brine and the mixture diluted with lukewarm water to precipitate a hydrous $MgCO_3$ filter cake. This gellant is then added to the remaining brine at elevated temperature followed by cooling to yield a gel in about 15 minutes. The gels formed by the process of this invention will, in most instances, have the consistency of a heavy cream but are essentially thixotropic such that when subjected to agitation, pressure or the like, as encountered in spray drier equipment, will become substantially fluid-like and hence be readily amenable to spray drying.

Further, as pointed out above spray dried magnesium chloride prepared according to earlier methods is used as feed material to melt cells in which the magnesium chloride is melted and simultaneously chlorinated to remove contaminants such as boron, MgOHCl and MgO. To this end it has been found that by adding an iron salt such as ferrous or ferric chloride and a reductant such as carbon to the molten $MgCl_2$ so as to maintain a prescribed level of ferric and/or ferrous chloride in the melt, chlorination efficiencies are greatly improved. It is therefore within the perview of the instant invention to add an iron salt and carbon to the brine—gellant mix of this invention prior to spray drying the gel with the result that the spray dried magnesium chloride will contain either or both iron and carbon when fed to the melt cell thus simplifying the addition of these agents to the molten magnesium chloride.

The invention is further illustrated by the following examples in which a desulfated, decarnallited magnesium chloride brine is used, a typical brine having the following analysis: 8.61% Mg, 0.28% Ca, 0.05% K, 0.11% Na, 0.069% Li, 510 ppm B, 25.5% Cl and 0.07% $SO_4$. The specific gravity of this brine was 1:317.

EXAMPLE I 0.8 lbs. MgO (4% based on brine) and 1.4 lbs. hot tap water at 100°F were homogenized in a Waring blender to form a gellant which was then dispersed in 20 lbs. brine preheated to 200°F. The brine mix was continuously agitated and after 1 hour the brine had gelled.

The brine gel was then fed into a spray drier and dried. The dried product was essentially in the form of solid spheres having a bulk density of 24 lbs. per cubic foot.

EXAMPLE II 0.8 lbs. MgO (4% based on brine) and 1.4 lbs. hot tap water at 100°F were homogenized in a Waring blender. The resulting magnesium hydroxide gellant was homogenized with an aliquot of magnesium chloride brine at 200°F and the homogenized mixture then dispersed in 20 lbs. of additional brine. This mix was maintained at 200°F with agitation. Heating was then discontinued and the mix allowed to cool while being continuously agitated. During this cooling period and while the mix was beginning to gel 0.26 lbs. carbon and 1.2 lbs. 30% $FeCl_2$ solution were dispersed in the gel. The resulting gel was spray dried and the dried product had a bulk density of 31.4 lbs. per cubic feet.

EXAMPLE III

The experiment of Example II was repeated except that the $FeCl_2$ was omitted. The gelled magnesium chloride brine was spray dried and produced a product having a bulk density of 27 lbs. per cubic foot.

EXAMPLE IV 0.4 lbs. MgO (4% based on brine) was homogenized in a blender with 0.8 lbs. water at 90°F. A 0.8 lb. aliquot of brine at 200°F was added to the MgO-$H_2O$ slurry and homogenizing continued. The homogenized slurry was then dispersed in 10 lbs. of additional brine at temperature of 200°F. On continued agitation the brine gelled in 45 minutes.

EXAMPLE V 0.4 lbs. MgO (4% based on brine) was homogenized with 0.8 lbs. aliquot brine at 200°F using a Waring blender. The resulting gellant was then dispersed in 10 lbs. of additional brine at 200°F. On continued agitation the magnesium chloride brine gelled in 30 minutes.

EXAMPLE VI

In this run the magnesium chloride brine had the following composition:

$MgCl_2$ - 34.2%; Na - 0.12%; K - 0.06%; Li - 0.11%; B - 0.78%; Ca - 0.35% and $SO_4$ - <0.05%.

To 1000 gms. of this brine were added 25 gms. MgO, 75 gms. $Mg(OH)_2$, 23 gms. $FeCl_3$ and 5 gms. carbon. These components were homogenized while heating to a temperature of 176°F with continuous agitation. A magnesium chloride brine gel was formed which was spray dried. The spray dried product was in the form of discrete spherical particles having a bulk density of 24 lbs. per cubic foot.

EXAMPLE VII

Another run was made like the run of Example VI except that the $Mg(OH)_2$ was omitted and the carbon increased from 5 to 13 gms. The spray dried product was substantially the same as that produced in Example VI.

EXAMPLE VIII

Another experiment was run using hydrous $MgCO_3$ as gellant. The hydrous $MgCO_3$ was prepared by adding an aqueous slurry comprising 28g $Na_2CO_3$ plus 112g lukewarm tap $H_2O$, i.e. at about 72°F, to 52g (9.3% Mg) brine and diluting the mixture with 348g lukewarm tap water to yield about 106g $MgCO_3$ filter cake. 53g of this $MgCO_3$ were agitated with 100g brine (4% MgO) at 200°F. A brine gel was formed in about 15 minutes.

EXAMPLE IX

Using the hydrous $MgCO_3$ gelling agent of Example VIII 5.5 lbs. of the $MgCO_3$ were admixed with 22 lbs. brine and 0.5 lbs. ferrous chloride (30% sol.) as 0.3% Fe. The mix was heated to about 190°F and a brine gel was formed in about 20 minutes. This product was then spray dried and the dried, particulate product recovered from the cyclone associated with the spray drier had a bulk density of about 27.3 lbs. per cubic foot.

The relatively dense spray dried magnesium chloride product made according to the process of this invention will have sufficiently high bulk density to permit easy handling and feeding. Moreover this dried magnesium chloride product is ideally suited for chlorination using the fluid-bed technique. It is commonly found that spray-dried magnesium chloride derived from salt lake brines and the like will contain small amounts of boron and magnesium oxide; and various methods now practiced in the art for removing these contaminants from the dried magnesium chloride include treating the salt with HCl, $Cl_2$, CO, $CH_4$ and even steam or methyl alcohol. However, due to the fluffy, light weight material produced by conventional spray-drying, it has been virtually impossible to chlorinate the product using fluid-bed techniques. However, the spray-dried magnesium chloride made according to the present invention is of sufficient density and particle size as to be readily chlorinated using fluidized bed operations.

The invention may be carried out in other specific ways than these herein set forth without departing from the spirit and essential characteristics of the invention, and the present embodiment is therefore to be considered in all respects as illustrative and not restrictive and all changes coming within the meaning and equivalency range of the appended claims are intended to be embraced therein.

We claim:

1. Method for treating magnesium chloride brine to form substantially solid particles of magnesium chloride having a bulk density of at least about 20 pounds per cubic foot and no more than about 3.0% water comprising the steps of: admixing a gelling agent and said magnesium chloride brine, said gelling agent selected from the group consisting of MgO, $Mg(OH)_2$, $MgCO_3$ and mixtures thereof, said gelling agent added in amount from 0.1 to 10.0% on a brine weight basis, homogenizing the mixture at elevated temperature but below 200°F. and then cooling the homogenized mixture with continuous agitation to form substantially solid particles of $MgCl_2$.

2. Method for treating magnesium chloride brine according to claim 1 wherein the mixture of gelling agent and magnesium chloride brine is homogenized at temperature in the range from 70° to 200°F.

3. Method for treating magnesium chloride brine according to claim 2 wherein the gelling agent is $Mg(OH)_2$ formed in situ by homogenizing an aqueous slurry of MgO with said $MgCl_2$ brine, said MgO added in amount from 0.1 to 10% on brine weight basis.

4. Method for treating magnesium chloride brine according to claim 2 wherein the $Mg(OH)_2$ gellant is formed exteriorly of said brine by homogenizing an aqueous slurry of MgO at a temperature below 100°F.

5. Method for treating magnesium chloride brine according to claim 2 wherein the gellant is hydrous $MgCO_3$.

6. Method for treating magnesium chloride brine according to claim 3 wherein an iron salt selected from the group consisting of ferric chloride and ferrous chloride is added to said magnesium chloride brine prior to homogenizing said brine.

7. Method for treating magnesium chloride brine according to claim 6 wherein said iron salt and carbon are added to said magnesium chloride brine during homogenizing said brine and said $Mg(OH)_2$ gellant.

8. Method for forming solid particles of magnesium chloride having a bulk density in range of from 20 to 45 lbs. per cubic foot and no more than about 3% water comprising: providing a magnesium chloride brine, adding a gellant to said brine said gellant being selected from the group consisting of MgO, $Mg(OH)_2$, $MgCO_3$ and mixtures thereof and in an amount from 0.1 to 10.0% on a brine weight basis, gelling said brine by homogenizing said brine and said gellant at temperatures in range from 70° to 200°F. followed by cooling with continuous agitation and then spray drying the gel to form substantially solid discrete particles of $MgCl_2$.

9. Method for forming solid particles of magnesium chloride according to claim 8 wherein said brine is a desulfated, decarnallited brine and said gellant is magnesium hydroxide formed in situ by homogenizing MgO with an aliquot of said brine said MgO added in amount from 0.1 to 10% on brine weight basis.

10. Method for forming solid particles of magnesium chloride according to claim 9 wherein an iron salt selected from the group consisting of ferric chloride and ferrous chloride is added to said brine-gellant mixture prior to homogenizing said mixture.

* * * * *